Dec. 15, 1936.  W. R. CURTISS  2,064,735

SIGNAL DEVICE

Filed March 27, 1933

INVENTOR.
William R. Curtiss
BY
L. Bascom Smith
ATTORNEY

Patented Dec. 15, 1936

2,064,735

UNITED STATES PATENT OFFICE 2,064,735

SIGNAL DEVICE

William R. Curtiss, Meriden, Conn., assignor to Connecticut Telephone & Electric Corporation, Meriden, Conn., a corporation of Delaware Application March 27, 1933, Serial No. 662,919

4 Claims. (Cl. 177—339)

This invention relates to signaling apparatus, and more particularly to electric signaling means for indicating movements of automotive vehicles.

One of the objects of the present invention is to provide new and improved signaling means for indicating the movements of a vehicle.

Another object of the invention is to provide a novel signaling system adapted to indicate either an actual or a predetermined movement of a vehicle upon which the same is installed.

Still another object is to provide a novel electric signal for indicating the turning movements of a vehicle, which signal may be initiated by the operative and which will be automatically switched off after the completion of the desired movement of the vehicle.

A further object is to provide a novel directional indicating hookup for motor vehicles adapted to be energized when the steering wheels are in turning position except when the motor is not in operation.

A still further object is to provide a simple and inexpensive signaling apparatus which may be readily installed on any type of automotive vehicle and which may be operated by the driver without interfering with his control of the vehicle.

The above and further objects and novel features of this invention will more fully appear from the following detailed description when taken in connection with the accompanying drawing. It is to be expressly understood, however, that the drawing is for the purpose of illustration only and is not designed as a definition of the limits of the invention, reference being had primarily for this purpose to the appended claims.

In the drawing wherein like reference characters refer to like parts throughout the several views.

Figure 1:
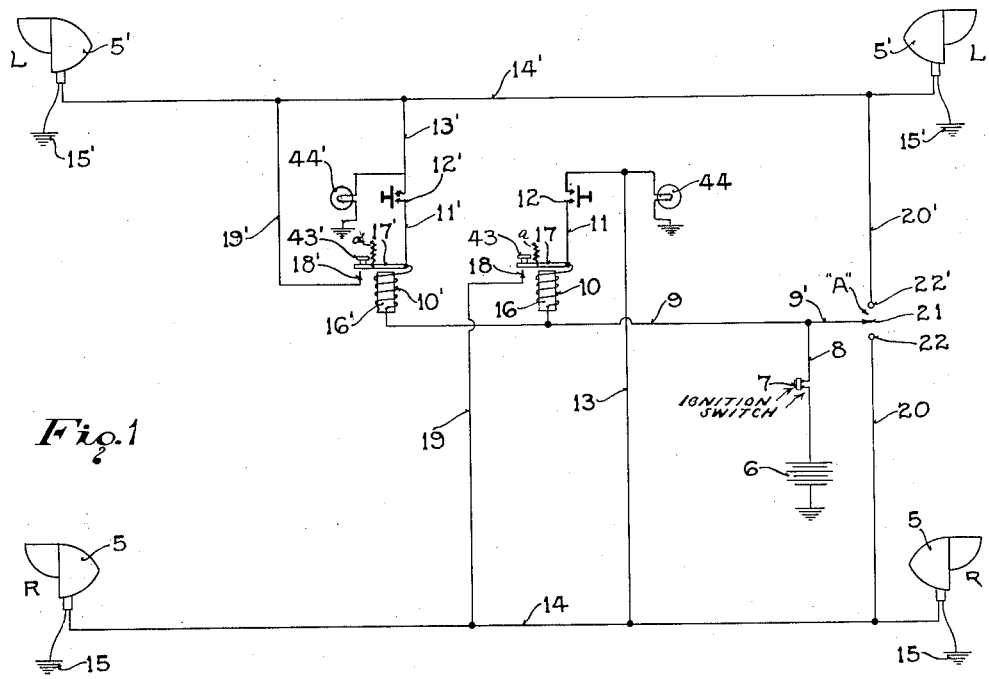
Fig. 1 is a diagrammatic view showing one form of the novel signaling system comprehended by this invention.

A single embodiment of a signal system illustrating, by way of example, the subject matter of the present invention is shown diagrammatically in Fig. 1. In the form shown, the system comprises a plurality of electric signals 5, 5', such as lamps, adapted to be suitably mounted on a vehicle, such as on the front and rear fenders thereof. When used as direction indicating signals, the lights mounted on the right-hand side of the vehicle may be marked with an "R" and those on the left with an "L", or both with arrows, the lights of each pair being connected in multiple for giving simultaneous indications of the driver's intentions to the front and to the rear.

A suitable source of electrical energy is provided for energizing the signals, said source, as shown, being constituted by a storage battery 6 which may be the usual battery employed in motor vehicles for the ignition system and headlights.

A novel signaling system is provided which employs an electric circuit for connecting said signals to said source whereby warning signals indicating the actual or predetermined movements of the vehicle may be given without interfering with the operator's control of the car during the execution of the movement. As illustrated, a separate circuit is provided for each pair of signals 5, 5', both of said circuits including battery 6. A circuit for the right-hand pair of signals comprises battery 6, ignition switch 7, leads 8 and 9, coil 10, lead 11, switch 12 and leads 13 and 14 to lights 5, returning through ground connections 15 to the battery. Switch 12 is preferably of the push-button type which will reopen as soon as released by the operator. The circuit for the left-hand signals 5' is identical to that described for the right-hand signals, and corresponding parts other than those common to both circuits are numbered 10', 11', etc.

Means are provided for maintaining a closed circuit to lights 5 once the operator presses the button of switch 12 and, as shown, such means are constituted by an electro-magnetic switch. The latter comprises coil 10 in series with switch 12, a soft iron core 16 in said coil and a pivoted armature 17 adapted to be attracted by said core against the efforts of suitable resilient means such as coil spring $a$ when current flows in coil 10. Armature 17 is made of a conducting material and is electrically connected to one end of coil 10. When armature 17 is attracted by magnet 10, 16, the free end thereof is adapted to engage a contact 18, thus closing a circuit through lead 19 to lead 14 and signals 5.

Means controlled by the steering mechanism are provided for closing a third circuit to signals 5 after a predetermined angular movement of said mechanism whereby electro-magnet 10, 16 is deenergized, said means being effective also to open said third circuit when the steering mechanism is returned to normal, ahead position. As illustrated, such means are constituted by switch "A" adapted to close a circuit from battery 6 through leads 8, 9', 20 and 14 to signals 5. The current from battery 6 takes the path of least resistance, that is, through the last-named circuit, thereby deenergizing electro-magnet 10, 16 and permitting armature 17 to be withdrawn from contact 18. As soon as the steering mechanism is returned to normal position, thus opening contacts 21, 22, the entire system will then be deenergized and no signals will remain in operation.

Figure 2:
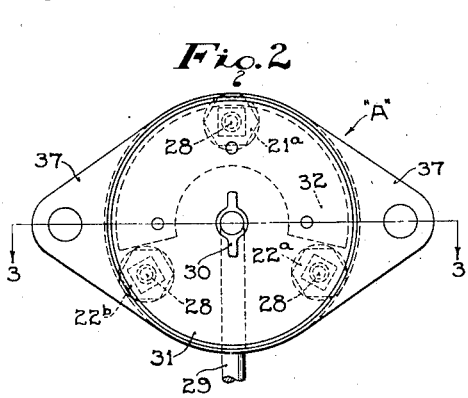
Fig. 2 is a side elevation view, with parts broken away, of a switch which may be employed in carrying out the present invention.
Figure 3:
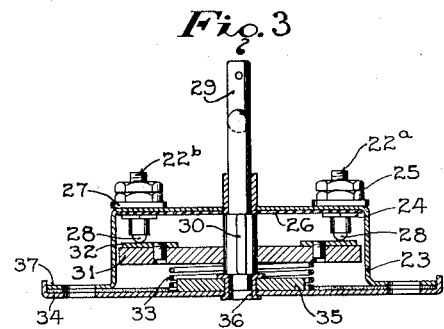
Fig. 3 is a cross sectional view of said switch taken on line 3—3 of Fig. 2.
Figure 4:
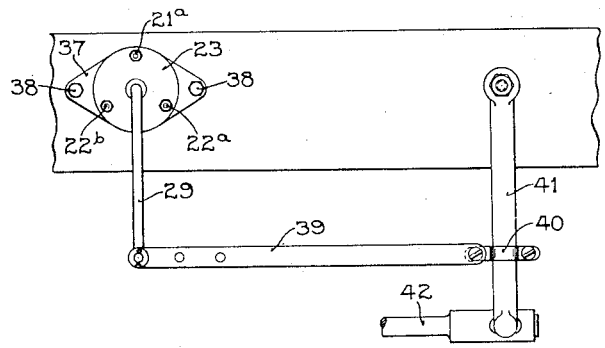
Fig. 4 is a side elevation view showing said switch mounted on the side frame member of a vehicle.

Details of a suitable form of switch "A", constituting an improvement over the switch illustrated in the patent to Joyce No. 1,779,773, are illustrated in Figs. 2, 3 and 4, wherein a cup-shaped casing 23 has three contacts 21a, 22a, 22b, corresponding to contacts 21, 22, 22', respectively, of Fig. 1 attached to the bottom thereof by means of flange 24 and nuts 25. The contacts are insulated from the casing by means of an insulating disc 26 and washers 27. As shown, the inner ends of contacts 21a, 22a, 22b are provided with recesses for receiving spring-pressed contact members 28. Said contacts are preferably placed near the periphery of casing 23 and are spaced at 120 degree intervals.

An operating crank or handle 29 extends through a central opening in the cover of said casing and has an irregularly shaped member 30 pinned thereto. An insulating disc 31 is provided with a suitable opening adapted to receive member 30 and has an arc of conducting material 32 riveted adjacent the periphery thereof. Suitable resilient means, such as spring 33, are interposed between disc 31 and a casing cover 34 for holding the former against contact members 28. The center of cover 34 is provided with a centering lug 35 for positioning said spring and with a bushing 36 in a central opening therein for receiving the free end of crank 29.

Preferably, casing 23 is provided with two laterally extending ears 37 adjacent the open end thereof, and cover 34 is shaped to fit over said ears. The latter and cover 34 have registering openings through which bolts 38 are adapted to extend for holding the cover in place and for mounting the switch on a frame member of the vehicle.

As shown in Fig. 4, crank 29 extends downwardly and is connected by means of strip 39 and bracket 40 to any suitable portion of the vehicle steering mechanism, such as pivoted support 41 for reach rod 42.

In the electrical hookup, the battery lead 19' is attached to contact 21a, and leads 20, 20' from the right and left-hand signal circuits, respectively, are attached to contacts 22a and 22b. The circuits are thus adapted to be closed upon movement of the steering mechanism by arc 32 which will then form a bridge from contact 21a to one of the contacts 22a or 22b. Arc 32 is attached to disc 31 in such a manner and is of such length that after a predetermined angular movement of the steering mechanism from its neutral position, a circuit will be closed across contacts 21a, 22a or 21a, 22b depending on which way the steering wheel is turned. When the latter is returned to neutral position, all circuits to signals 5 or 5' will be broken as pointed out above.

In order that no signals will be energized while the vehicle is parked with cramped wheels, thus running down the battery and serving no useful purpose, lead 8 from the latter may be taken through ignition switch 7 of the type mounted on any car. Thus, whenever the car is not in operation, all circuits to signals 5 will be broken at the ignition switch.

When the driver decides to make a turn or change his course, for instance to the right, it is merely necessary for him to press the button of switch 12 thus momentarily closing the circuit including battery 6, switch 7, leads 8 and 9, coil 10, lead 11, switch 12, leads 13, 14 and signals 5. The electro-magnet 10, 16 is thereby energized moving armature 17 into engagement with contact 18, thus maintaining a circuit from battery 6 through lead 19 after switch 12 is released by the driver. The signal is thus maintained in operation and the driver is free to control his car. As soon as the turn is started, the steering mechanism is effective to rotate disc 31 causing arc 32 to bridge contacts 21a, 22a, thus closing a third circuit from battery 6 through switch 7, leads 8 and 9', contacts 21a, 22a and leads 20, 14 to signals 5. The battery current seeking the path of least resistance flows to signals 5 through the last named circuit instead of through electro-magnet 10, 16. The latter is, therefore, shunted, and armature 17 is withdrawn from contact 18 by spring a. Signals 5 continue, then, to operate until the steering wheel is returned to within a predetermined number of degrees of neutral position when the circuit is broken between contacts 21a, 22a. Should the operator for any reason forget to close switch 12 before turning, a circuit through switch "A" would be automatically closed as soon as the turn is started.

For the purpose of breaking the circuit to signals 5 in the event the operator should accidentally push the wrong button or decide not to turn after having pushed the same, a suitable knob 43 is provided on armature 17 for manually withdrawing the same from electro-magnet 10, 16 to break the circuit at contact 18. It is also pointed out that the electro-magnetic switch may be employed for initially energizing the signals in lieu of the push-button switch 12 which may, if desired, be eliminated.

Pilot lights 44, 44' may be provided on the dash or other suitable place to indicate to the driver when and which of his turn indicating signals is operating. As shown, lights 44, 44' have one terminal connected to ground and the other to leads 14, 14' of the respective circuits.

There is thus provided novel signaling apparatus for indicating movements of a vehicle and a novel electrical circuit for the same which may be easily and effectively operated without interfering with the driver's complete control over the car. The apparatus provided comprises only a small number of parts, is inexpensive and may be readily installed on any automotive vehicle.

Although only one embodiment of the invention has been illustrated and described, it is to be expressly understood that the same is not limited thereto but that various changes may be made therein. For example, the push-button switches, as well as the ignition switch, may be dispensed with if desired, and the signals provided may be of any desired design having letters, arrows or other suitable indicating means and may be installed on the vehicle in any convenient position. Various other changes may be made in the design and arrangement of parts illustrated without departing from the spirit of the invention. Reference will be had primarily to the appended claims for a definition of the limits of the invention.

What is claimed is:

1. In a directional signal system for an automotive vehicle or the like, the combination of a plurality of signaling devices, a plurality of electro-magnets, means connecting one side of each of said devices to one end of the coil of the respective one of said electro-magnets, each of said connecting means including a switch adapted to be maintained closed by the electro-magnet in circuit therewith, resilient means for normally holding said switch in open position, means including a common conductor connecting the other ends of said coils to one terminal of a source of electric energy, switch means having a plurality of fixed contacts and a movable contact member, the latter being mechanically connected to the steering mechanism of the vehicle for movement into selective engagement with either of said fixed contacts, means electrically connecting said movable contact member to said terminal of said source of electric energy, means connecting each of said fixed contacts to a respective one of said signaling devices in parallel with a respective one of said first-named switches, and means connecting said signaling devices and the other terminal of said source, any one of said electro-magnets being rendered ineffective to hold the respective one of said first-named switches closed when said movable contact member engages one of said fixed contacts.

2. In a directional signal system for an automotive vehicle or the like, the combination of a plurality of electric signaling devices, a plurality of electro-magnets, means connecting one side of each of said devices to one end of the coil of the respective one of said electro-magnets, each of said connecting means including a normally open switch adapted to be closed by the electro-magnet in circuit therewith, other means connecting said side of each of said signaling devices to the same end of the respective coil, each of said other connecting means including a normally open switch, means including a common conductor connecting the other ends of said coils to one terminal of a source of electric energy, switch means having a plurality of fixed contacts and a movable contact, the latter being operatively connected to the steering mechanism of the vehicle for movement into selective engagement with either of said fixed contacts, means electrically connecting said movable contact to said terminal of the source of electric energy, means connecting each of said fixed contacts to a respective one of said signaling devices, whereby said switch means is connected in parallel with said first-named switches, and means connecting said signaling devices and the other terminal of said source, any of said electro-magnets being rendered ineffective to hold the respective first-named switches closed when said movable contact engages one of said fixed contacts.

3. In a directional signal system for an automotive vehicle or the like, the combination of a plurality of electric signaling devices, a plurality of electro-magnets, means connecting one side of each of said devices to one end of the coil of the respective electro-magnet, each of said connecting means including a normally open switch adapted to be closed by the electro-magnet in circuit therewith, other means connecting said side of each of said signaling devices to the same ends, respectively, of said coils, each of said other connecting means including a normally open push button switch, said electro-magnets being so constructed that when one of said push button switches is closed the electro-magnets not connected in circuit therewith are rendered ineffective to hold said first-named switches in closed position, means including a common conductor connecting the other ends of said coils to one terminal of a source of electric energy, switch means in parallel with said first-named switches and having a plurality of fixed contacts and a movable contact, the latter being operatively connected to the steering mechanism of the vehicle for movement into selective engagement with either of said fixed contacts, means electrically connecting said movable contact to said terminal of the source of electric energy, means connecting each of said fixed contacts to a respective one of said signaling devices, and means connecting said signaling devices and the other terminal of said source, any of said electro-magnets being rendered ineffective to hold the respective first-named switches closed when said movable contact engages one of said fixed contacts.

4. In a directional signal system for an automotive vehicle or the like, the combination of a plurality of signaling devices, an electro-magnet for each of said devices, a plurality of connecting means for connecting one side of each of said devices to one end of the coil of the electro-magnet therefor, each of said connecting means including a switch adapted to be closed by the electro-magnet in circuit therewith, a push button switch connected in parallel with said first-named switch, resilient means for normally holding said first-named switch in open position, means including a common conductor connecting the other ends of said coils to one terminal of a source of electric energy, switch means having a plurality of fixed contacts and a movable contact member, the latter being mechanically connected to the steering mechanism of the vehicle for movement into selective engagement with either of said fixed contacts, means electrically connecting said movable contact member to said terminal of said source of electric energy, means connecting each one of said fixed contacts to a different one of said signaling devices in parallel with the respective one of said first-named switches, and means connecting said signaling devices and the other terminal of said source, any one of said electro-magnets being rendered ineffective to hold the respective one of said first-named switches closed when said movable contact member engages one of said fixed contacts.

WILLIAM R. CURTISS.